July 28, 1931. R. H. HARDOEN 1,815,909
ELECTRONIC RECTIFIER
Filed June 21, 1927

INVENTOR,
Robert Hammond Hardoen
BY Howard D. Smith,
ATTORNEY

Patented July 28, 1931

1,815,909

UNITED STATES PATENT OFFICE

ROBERT HAMMOND HARDOEN, OF XENIA, OHIO, ASSIGNOR TO THE ELECTRO CHEMICAL COMPANY, OF DAYTON, OHIO, A CORPORATION OF OHIO

ELECTRONIC RECTIFIER

Application filed June 21, 1927. Serial No. 200,340.

This invention relates to new and useful improvements in electronic rectifiers.

It is one of the principal objects of my invention to provide for radio and other electrical use, an electronic rectifier that is small, economic and efficient. It preferably comprises a ferrous sulphide-aluminum couple, although the first electrolyte may be employed with magnesium or any other metal having an atomic number from 11 to 14 inclusive.

My improved rectifier may be embodied in an assembly in which a piece of ferrous sulphide is placed between two electrical contacts, one of which is copper, and the other a metal having an atomic number between 11 and 14 inclusive, such as aluminum. With the ferrous sulphide an alkaline metal such as sodium may be fused to increase its efficiency.

The ferrous sulphide may also be placed in a porcelain or fire clay tubular container between copper and aluminum contacts.

Figure 1:
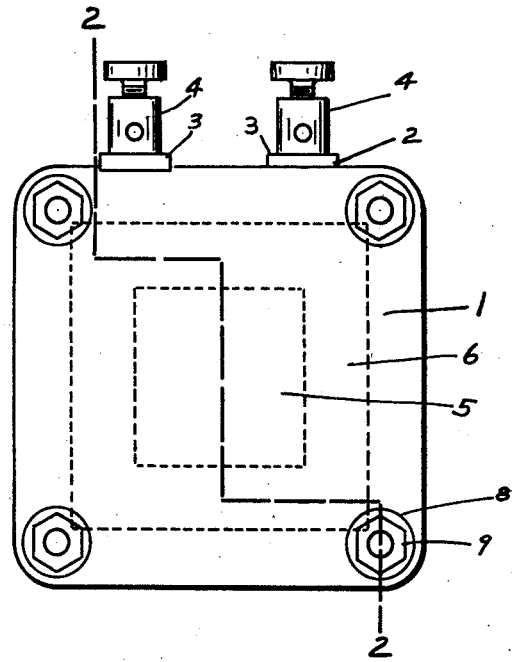
Figure 2:
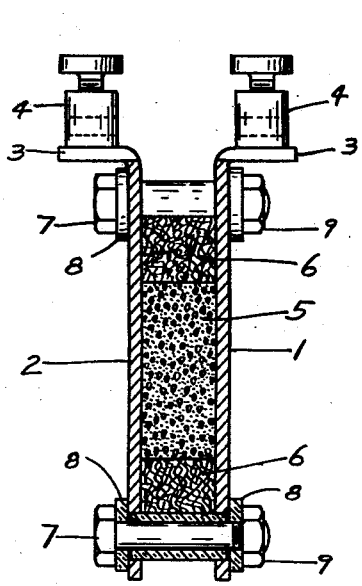
Figure 3:
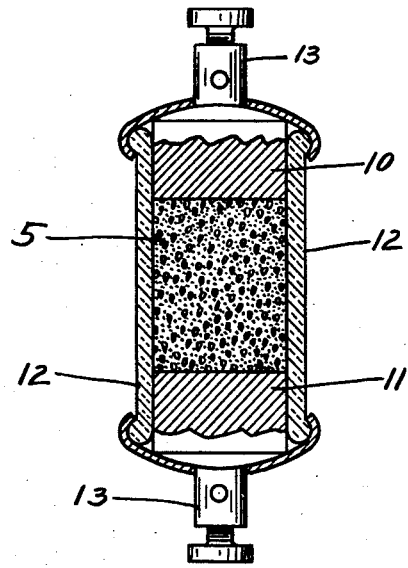

In the accompanying drawings illustrating my invention, Figure 1 is a side view taken through my rectifier when the ferrous sulphide is mounted between a copper and an aluminum contact plate. Figure 2 is a sectional view taken through said assembly on the line 2—2 of Figure 1. And Figure 3 is a longitudinal, sectional view taken through a tubular container for the ferrous sulphide.

Referring to the accompanying drawings for a detailed description of the various forms of embodiment of my invention, the numeral 1 in Figures 1 and 2 designates a plate which is preferably made of aluminum, although it may be formed of any other metal having an atomic number between 11 and 14 inclusive. In the same figures the numeral 2 designates a plate made of copper.

Each one of the plates 1 and 2 is formed at its upper end with a horizontal supporting lip 3 for a binding post 4. Centrally mounted between the plates 1 and 2 is a piece of solid ferrous sulphide 5. Above and below the latter an asbestos sheet 6 is placed between the plates. The latter are connected together with studs 7, fiber washers 8 and nuts 9 to firmly hold the ferrous sulphide between them.

When a step-down transformer, such as is commonly used in connection with battery chargers, was connected to a direct current ammeter and a direct current voltmeter, and in series with the ferrous sulphide 5 and the aluminum plate 1 in the assembly just described, it was found that a steady, direct current of one volt and three amperes was obtained. This indicated that the couple, ferrous sulphide-aluminum, would permit the current to pass only in one direction, and that this couple, therefore, was a highly efficient rectifier for alternating currents.

When an alkaline metal, such as sodium in the form of sodium sulphide, was fused with the ferrous sulphide, it was found to highly increase its efficiency, and that such a rectifier passed a direct current of as high as twenty amperes.

In Figure 3 I have shown the solid electrolyte 5, ferrous sulphide, mounted between an aluminum contact 10 and a copper contact 11 in a tubular porcelain container 12. Projecting through each end of the container 12 is a binding post 13, one post being in engagement with the aluminum contact 10 and the other with the copper contact 11.

Whatever may be the form of assembly of the ferrous sulphide and the aluminum or other metal with which it is associated, the rectifying results will be the same. It is highly advantageous, however, to have the assembly as small and compact as possible, and more particularly when it is used for radio purposes.

A rectifying couple comprised of ferrous sulphide and one of the above mentioned family of metals, is capable of longer life, and enclosure in a smaller housing space, than any other rectifier with which I am familiar.

Having described my invention, I claim:

An electronic rectifier comprising a piece of ferrous sulphide fused with sodium sulphide in contact with a metal having an atomic number between 11 and 14 inclusive.

In testimony whereof I have hereunto set my hand this 18th day of June, 1927.

ROBERT HAMMOND HARDOEN.